United States Patent
Mesiä et al.

(10) Patent No.: US 10,017,362 B2
(45) Date of Patent: Jul. 10, 2018

(54) APPARATUS AND METHOD IN CONNECTION WITH CRANE SHEAVE

(71) Applicant: KONECRANES PLC, Hyvinkää (FI)

(72) Inventors: Heikki Mesiä, Vantaa (FI); Lasse Eriksson, Espoo (FI); Hannu Lindfors, Järvenpää (FI); Kim Schlesier, Kaarina (FI); Timo Vuorela, Tampere (FI); Mika Inkinen, Tampere (FI); Manu Myry, Kolkki (FI); Pekka Ruuskanen, Tampere (FI); Mikko Jääskeläinen, Helsinki (FI); Martti Paju, Pori (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 656 days.

(21) Appl. No.: 14/396,927

(22) PCT Filed: Apr. 23, 2013

(86) PCT No.: PCT/FI2013/050451
§ 371 (c)(1),
(2) Date: Oct. 24, 2014

(87) PCT Pub. No.: WO2013/160548
PCT Pub. Date: Oct. 31, 2013

(65) Prior Publication Data
US 2015/0123476 A1    May 7, 2015

(30) Foreign Application Priority Data

Apr. 26, 2012   (FI) .................................... 20125460

(51) Int. Cl.
   *B66B 13/00*   (2006.01)
   *B66C 13/16*   (2006.01)
   (Continued)

(52) U.S. Cl.
   CPC .............. *B66C 13/00* (2013.01); *B66C 13/16* (2013.01); *B66C 13/28* (2013.01); *B66D 1/28* (2013.01);
   (Continued)

(58) Field of Classification Search
   USPC ........................................... 307/29
   See application file for complete search history.

(56) References Cited

U.S. PATENT DOCUMENTS 3,837,698 A      9/1974   Foster
5,071,184 A  *  12/1991   Dessaux  ............... B66C 13/085
                                                         294/82.15
(Continued)

FOREIGN PATENT DOCUMENTS

CN   101439825    *   5/2009
CN   101439825  A     5/2009
(Continued)

*Primary Examiner* — Rexford Barnie
*Assistant Examiner* — Xuan Ly
(74) *Attorney, Agent, or Firm* — Birch, Stewart, Kolasch & Birch, LLP

(57) ABSTRACT

An apparatus for collecting energy in connection with a sheave system in a hoisting apparatus provided with a sheave system. The apparatus includes at least one generator including a rotor and at least one stator. The rotor is connected rigidly to a sheave of the sheave system, and the at least one stator is connected rigidly to the sheave system such that when the load of the hoisting apparatus is rising or lowering, said at least one sheave rotates, whereby the rotor rotates simultaneously but the stator does not rotate, whereby electric energy is induced in the stator. The apparatus further includes electric energy storage, a device for modifying induced electric energy and storing it in energy storage; and a device for supplying energy from the energy storage to at least one consumption device. The consumption device may be, for example, a working lamp, sensor, mea-
(Continued)

suring device, communications device, signal device, charging plug or a combination of these mounted in connection with the sheave system.

16 Claims, 15 Drawing Sheets

(51) Int. Cl.
*F03G 1/00* (2006.01)
*H02J 1/10* (2006.01)
*H02J 7/00* (2006.01)
*H02J 7/35* (2006.01)
*B66C 13/00* (2006.01)
*B66C 13/28* (2006.01)
*B66D 1/28* (2006.01)
*H02K 7/18* (2006.01)

(52) U.S. Cl.
CPC ............... *F03G 1/00* (2013.01); *H02J 1/10* (2013.01); *H02J 7/0068* (2013.01); *H02J 7/35* (2013.01); *H02K 7/1853* (2013.01); *Y10T 307/391* (2015.04); *Y10T 307/658* (2015.04); *Y10T 307/702* (2015.04); *Y10T 307/718* (2015.04)

(56) References Cited

U.S. PATENT DOCUMENTS

| | | | |
|---|---|---|---|
| 2002/0065171 A1* | 5/2002 | Raber | F16D 21/06 477/175 |
| 2005/0279976 A1 | 12/2005 | Kohlenberg et al. | |
| 2008/0048497 A1* | 2/2008 | Donnelly | B66C 13/18 307/19 |
| 2011/0253662 A1* | 10/2011 | Stander | B66C 13/14 212/281 |
| 2017/0192474 A1* | 7/2017 | Robinson | G06F 1/263 |

FOREIGN PATENT DOCUMENTS

| | | |
|---|---|---|
| DE | 100 01 215 A1 | 10/2000 |
| DE | 10 2004 027 106 A1 | 12/2005 |
| DE | 10 2009 036 480 A1 | 2/2011 |
| JP | 58-13204 A | 1/1983 |
| KR | 10-0860624 B1 | 9/2008 |
| KR | 10-2010-0022835 A | 3/2010 |

* cited by examiner

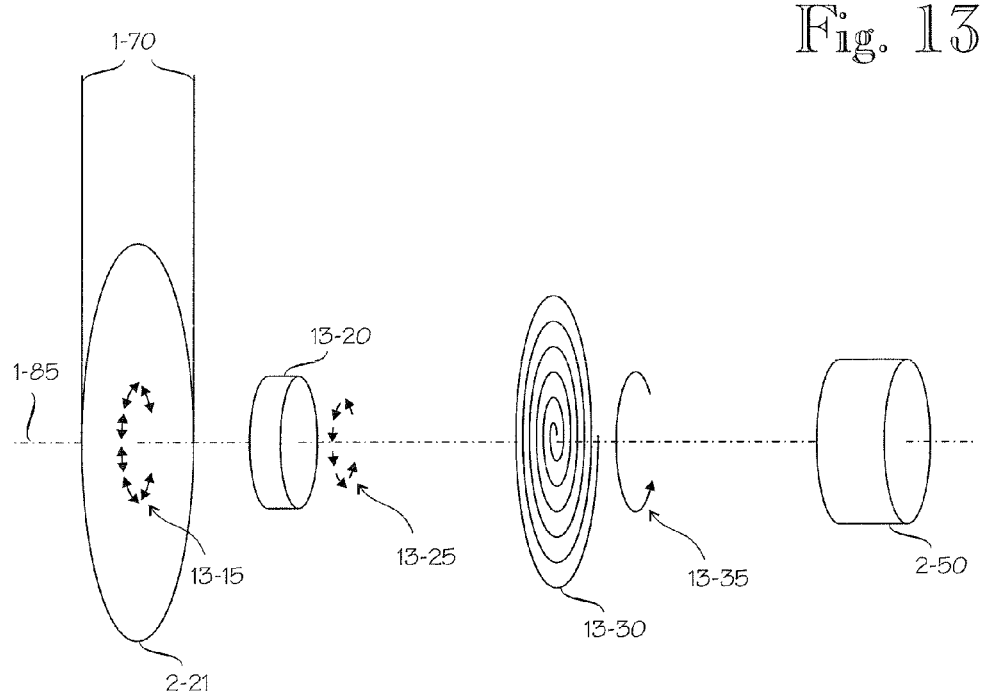

APPARATUS AND METHOD IN CONNECTION WITH CRANE SHEAVE

PARENT CASE INFORMATION

The present application is a national-phase application of PCT/FI2013/050451 (published as WO2013160548), which claims priority from Finnish patent application FI 20125460 filed 26 Apr. 2012.

FIELD OF THE INVENTION

The invention relates to techniques with which apparatuses requiring electricity can be mounted on hoisting machines, such as cranes or the like, in connection with a sheave, particularly a sheave moving along with a hook or another load-fixing means. The invention relates to a crane or a hoist in which a hook or the like is lifted and lowered by a rope or chain passing through at least one sheave, whereby the sheave turns the linear movement of the rope into rotating movement. The use of the invention is not, however, restricted to sheaves moving along with a hook or the like but the invention may be used with other sheaves as well.

BACKGROUND OF THE INVENTION

In the following description, the terms 'crane' and 'hoisting machine' or 'hoisting apparatus' are used as synonyms. Correspondingly, the term 'hook' is used to refer to all types of load-fixing means. In this description, 'down' means, as usual, the direction in which gravitation tends to draw mass, and 'up' is the direction opposite to gravitation. In connection with elements of a crane, 'up' and 'down' refer to the normal operating state of the crane. For instance, a conventional hook is said to open upwards and to be closed in the lower part even if the hook were, in some cases, in a position deviating from its normal position. In a crane having a trolley which moves supported by a horizontal girder, i.e. a bridge, and from which a sheave carrying the hook is suspended via a rope or chain, supplying power in connection with the hook is difficult because the hook moves vertically relative to the crane trolley and horizontally when the trolley and the bridge are moving in lateral directions. If power supply is required for the hook or some other type of catch, the cable used is custom-made and thus expensive. The cable is also sensitive to wearing and stress. Also with regard to its structure, such a solution is expensive and difficult to implement, although such solutions are used when required, particularly in large cranes. There would be many applications for power supply in connection with a hook, also in smaller cranes in which providing power supply in connection with the hook would be unreasonably expensive proportioned to the price of the crane.

Publication DE10001215A1 discloses a dynamo supplying current to a radio transmitter at the end of a telescopic crane jib. The dynamo is mounted radially on a rigid structure in a manner known from bicycles but this structure extends and retracts telescopically.

Publication DE 102004027106A1 discloses a sensor to be mounted on a gearbox above the crane hook for weighing the load. Publications DE102009036480A1 and U.S. Pat. No. 5,071,184 also disclose various techniques for supplying energy to crane structures.

However, applying known structures to cranes involves some particular problems. There are certain problems in the techniques disclosed in the above references. For example when the crane hook is supported against the crane frame via a flexible structure, such as a cable or chain, supplying energy to the hook from fixed structures of the crane is remarkably cumbersome.

Further, for instance in connection with bicycles, it is generally known to generate current locally, for instance by using a dynamo connected to a bicycle wheel via frictional force. If energy is generated by a generator connected to a sheave radially in the same way as a bicycle dynamo, the structure easily gets dirty and is sensitive to moisture and freezing, in which case the risk is that in wintertime the dynamo will not rotate or generate current.

Further, the use of a crane is irregular by nature, so the sheaves do not rotate continuously either. Energy may be needed in connection with a hook or generally in connection with sheaves even between the operating moments of the crane. If it were desirable to exploit energy in a working lamp mounted in connection with a hook, for example, it would not be reasonable for the working lamp to work only when the hook is rising or lowering. Yet another particular problem is that the vertical movement of a crane hook is extremely slow compared with, for instance, the speed of a bicycle. A bicycle typically moves about 6 meters per second (about 20 km/h), whereas the vertical speed of a crane hook is typically 6 meters per minute. Despite this, a bicycle dynamo contains transmission with which the rotation speed of the dynamo is increased compared with the rotation speed of the wheel in proportion to the radii of the rims, i.e. about 50-fold. The rotation speed of a crane sheave thus barely reaches one percent of the rotation speed of a bicycle dynamo.

Generating usable output power from the movement of a crane sheave is thus, to say the least, challenging. Transmission based on frictional force would, per se, provide an easy way to increase the rotation speed of a generator but a problem is, for example, the loss of frictional force caused by freezing and the resulting locking of the dynamo. Thus, when the structure freezes, the dynamo will not rotate or generate energy. On the other hand, with rigid connection of the generator to the sheave, the rotation speed of the generator remains as low as the revolution speed of the sheave, which is typically only a few revolutions per minute.

BRIEF DESCRIPTION OF THE INVENTION

It is an object of the invention to provide a method and an apparatus implementing the method with which at least one of the problems of the known solutions can be alleviated. The object of the invention is achieved by a method and an apparatus that are characterized by what is stated in the independent claims.

The dependent claims and this patent description as well as the figures relate to specific embodiments which provide some additional advantages and/or present particularly preferred manners to solve problems.

The invention is based on the idea of providing an apparatus for collecting energy in connection with a sheave system in a hoisting apparatus provided with a sheave system. The apparatus according to the invention comprises:
at least one generator comprising a rotor and at least one stator;
wherein the rotor is connected rigidly to a sheave of the sheave system, and said at least one stator is connected rigidly to the sheave system such that when the load of the hoisting apparatus is rising or lowering, said at least one sheave rotates, whereby the rotor rotates simultaneously but the stator does not rotate, whereby a voltage is induced in the stator;

energy storage;

means for modifying the electric energy obtained by means of the voltage induced in the stator and for storing it in the energy storage; and means for supplying energy from the energy storage to at least one consumption device.

Contrary to connections such as the above-mentioned bicycle dynamo, connecting the stator rigidly to the sheave system means, in this invention, non-slip connection. In this way, it becomes possible to avoid a great problem of connections such as a dynamo, i.e. slippage of the connection when contact surfaces get wet, freeze and/or get dirty. Non-slip connection may be implemented for instance by means of direct coupling, tooth wheels or belts, or belts of other types, if the connection of the belt to the belt pulleys is implemented in a suitable manner. Thus, non-slip connection does not exclude the possibility of there being in some embodiments, between the sheave and the generator, transmission that increases the rotation speed of the generator, ratchet mechanism for converting reciprocating movement into unidirectional movement and/or storage for mechanical energy, which receives and stores mechanical energy to discharge the stored energy to the generator in batches greater than a threshold value.

The apparatus according to the invention for collecting energy may be mounted on the hoisting apparatus already in connection with the manufacture. Alternatively, the apparatus may be designed for retrofitting for existing hoisting apparatuses. Hence, one aspect of the invention is an energy-collecting apparatus per se, another one being a hoisting apparatus comprising an energy-collecting apparatus. A third aspect of the invention is a method for collecting energy in connection with a sheave system of a hoisting apparatus.

In the following description, the term 'crane' is used as an example of a hoisting apparatus or machine on which an energy collector according to the invention may be mounted. From the point of view of the invention, it is required of the hoisting apparatus that there be at least one sheave in which the linear movement of the rope causes the sheave to rotate. In accordance with the invention, the energy collector is mounted on the sheave positioned in connection with a load-fixing means. The load-fixing means may be, for instance, a hook, grab, clamshell, bucket catch, another catch or electromagnet supported by a sheave which rotates when the hook is lifted or lowered. Those skilled in the art will understand that the essential feature in this embodiment is the lifting or lowering of the fixing point of the load via a sheave, and the term 'hook' is used as a general term to refer to all types of load-fixing means.

In accordance with a preferred embodiment, collecting energy is based on a permanently magnetized axial flux generator, an advantage of which as compared with a radial flux machine is, for example, greater power density. Greater power density makes it possible to generate more energy with a generator of a given size or, in reverse, the same energy with a smaller generator than in the case of a radial flux machine. A second advantage as compared with a radial flux machine is a flat size, which facilitates the positioning of the energy collector according to the invention for instance in connection with a sheave system provided with a sheave system.

The rotor of an axial flux generator is formed of a rotor plate and permanent magnets attached to it. In the case of a sheave, the magnets may also be attached directly to the sheave. The stator side has a winding in which, when the sheave and thus also the magnets are rotating, a voltage is induced, resulting in current generated by the generator.

A sheave already present in a crane might, for instance in retrofitting, serve as the rotor body of the generator and provide ready-made attachment surfaces and bearings. The sheave shaft may offer the generator a usable shaft for generating driving power for the generator in a manner that is not sensitive to slippage due to the surfaces getting moist or dirty or freezing. Then, the requirement for space and the sheave support structure itself can be implemented in a smaller size without having to compromise the lifting capacity. The smaller size usually provides the advantage that also the height of the hook block is smaller, whereby the lifting height itself can be maximized. A small hook block also forms a smaller visual obstruction in lifting, which improves safety. Further, common bearing and control surfaces reduce mechanical losses, whereby the electric output itself is greater.

On the stator side, energy is modified by rectification and filtering, for example, in manners required by the apparatuses connected to the energy collector and the charging voltage of the accumulator.

The use of a crane is irregular, so the sheaves do not rotate continuously either, and thus energy storing is necessary. Further, energy may be needed in the hook or in the sheaves in general even between the operating moments of the crane. For this purpose, the energy collector is provided with energy storage, such as an accumulator, supercapacitor, etc. Implemented in the above manner, the energy collector generates a significant amount of energy. For example, even an empty hook may generate several watts, and when loaded, it generates significantly more. This enables supplying energy from the hook to other devices for their operation and for charging accumulators. A generator may generate power in both rotating directions of the sheave, in other words both when the hook is lifted and when it is lowered.

Loading of the hook affects energy production in that the weight of an empty hook generates sufficient friction between the rope and the sheave. The generator obtains its energy by resisting the movement of the sheave via its electromagnetic force, simultaneously inducing a voltage, and if the generator is dimensioned too large, the rope will not be able to pull the sheave to move. In accordance with an embodiment, the loading may be dynamically adapting, in which case the load connected to the hook can be measured during the movement, and the power input can be increased on the basis of how large a load is being carried.

Energy of the energy storage may be used for implementing several functions in connection with a sheave, particularly in connection with a hook. For example, various sensors may be connected to the hook to measure the load and/or the distance of the hook or load from obstacles. Instead of or in addition to sensors, computing units may be installed to store and process data. Furthermore, data and measurements may be transmitted wirelessly from the hook to the automation system of the crane and/or directly to the information system of the installation, whereby measurement of the load can be easily implemented with a sensor attached to the hook. Load measuring may also control the energy collector. On the basis of the load, it may be determined, for example, whether energy is collected or not.

The energy collector must be dimensioned for a typical load, which may be either the weight of an empty hook or the weight of a typical load to be lifted by the crane. The greater the load, the greater also the energy output. In the lowering movement, the primary energy source is potential energy. In the hoisting movement, the energy source is a hoist motor, the shaft of which is subjected to an additional torque required for rotating the generator of the energy collector. This additional torque is usually relatively low in relation to the torque required for hoisting. The amount of additional torque depends on the electric loading of the generator and on small mechanical losses.

If the collector is dimensioned for a heavier load than the load of an empty hook, no energy can be collected unless the hook is provided with a sufficiently heavy load. In order to detect slip, the data of the weighting sensor on the load can be used in the hook. When the mass of the load is sufficiently great, energy recovery can be started. Slipping of the sheave can be detected for instance in such a way that the crane wirelessly informs the energy collector about the prevailing hoisting speed. Thus, by monitoring the form of the voltage given by the energy collector, for example, it is possible to deduce the speed and direction of movement of the sheave. Comparing the hoisting speed of the crane with the measured sheave speed allows slip to be detected. This data may also be used for controlling the generator, in other words how much power is extracted, whereby it becomes possible to implement dynamically adapting loading.

Measurements in connection with the hook or the sheave are feasible when it has been possible to generate electric energy there without a separate conductor. Correspondingly, the actuators of the sheave may be in wireless connection to other devices of the crane, whereby measurement and state data can be combined among various parts of the crane. A wireless connection for example between the hoist motor and the hook of the crane may thus serve bidirectionally and in two different meanings. Then, the load sensors may control the collector circuit and prevent energy from being collected if the load requirements are not met, i.e. if the torque driving the sheave is not sufficiently high. The torque can be measured, and the measurement result can be used as one alternative for activating the collector circuit of the energy collector.

In the energy collector, measurement of the charge level of the energy storage can also be easily utilized and overcharging prevented for instance when the storage is full, whereby the energy collector is controlled to be out of use or the energy generated by it is consumed in a lamp or the like, as a result of which the accumulator is prevented from being overcharged.

Since an energy collector dimensioned appropriately is able to produce a significant amount of energy, the hook may even be provided with working lamps, such as LEDs, which illuminate the surroundings of the hook, particularly the area below the hook. In this way, working with a crane can be facilitated, and/or outsiders can be warned not to go under a load that has been lifted up.

In addition, the crane may transmit messages to a radio module connected to the hook during operation, in which case the radio module may control for instance warning lights connected to the hook. Warning by sound signals is also feasible. Lights may be used to communicate about obstacles that are too close, for example, if the crane knows the locations of the obstacles and is able to measure them. Instead of or in addition to this, the hook may illuminate the direction in which the crane is moving. If mounted in connection with the load-fixing means, the energy collector and storage enable measuring the use of the crane and performing measurements of condition monitoring for the crane components with appropriate sensors, and possibly a processing possibility and/or installing a radio connection for these purposes. To arrange such a processing possibility, the apparatus may comprise, for example, a programmable microprocessor or a permanently or a semi-permanently programmed logic circuit, i.e. what is called an FPGA ("field programmable gate array"), or other corresponding solutions.

On the basis of the current pulses of the generator, also the distance travelled by the rope can be measured, and this data may be utilized for instance in monitoring the condition of the rope. The measured distance may be compared with the distance fed by the rope drum, whereby it becomes possible to find out, on the basis of a possible change in the length, the stretch of the rope and, in addition to that, the change in the rope diameter or another variable indicating the condition of the rope. Instead of a rope, also another flexible element, such as a chain or belt, may naturally be used.

The hook may also be provided with portable devices for charging their accumulators. Examples of such devices include a radio controller of the crane, a torch and portable electronic devices, such as a mobile phone, PDA or wireless sensor etc. Further, the energy collector and storing device may provide an interface for connecting other devices to the information system of the crane. The device comprises a standard connector or some standard connectors, such as a USB connector, via which a mobile phone, for example, can be connected to the device. Then, the device can read the data on the crane wirelessly from the automation system and transmit them via the USB connector to a mobile phone, from which they can be transmitted via a radio path (GPRS, 3G, 4G, WLAN, Bluetooth, etc.) to, for instance, the client's information system or to the information systems of the company responsible for the maintenance of the crane. The data to be transmitted may include, for instance, the service data, condition monitoring measurements or analysis results of the crane etc.

Also, a user interface for the operator may be connected to the hook. A display may show measurement data on the crane (e.g. the load and/or location of the hook or its distance to a target point), and via the user interface, it becomes also possible to carry out configurations affecting the operation of the crane.

The energy collector comprises a generator arranged to exploit mechanical energy generated from the vertical movement of the crane hook and to produce electric energy. The generator preferably comprises an axial flux generator. In addition to or instead of comprising a main generator exploiting the movement of the crane hook, the energy collector may also comprise one or more auxiliary generators which keep the energy storage in charge and/or feed power to higher-priority energy consumption devices, also when the crane is immovable for long periods. Such an auxiliary generator may comprise a solar panel and/or a wind generator, for example.

The energy storage preferably comprises one or more accumulators which store energy as changes in the electrochemical charge level. The accumulator may be of any type generally used, such as a lithium ion, lithium polymer (LiPo), nickel-metal hybrid (NiMH), nickel cadmium (NiCd), lead accumulator etc. The energy consumption devices include various sensors, measuring devices, cameras, communication devices, lamps, sound signal device, warning lights etc. A hook block transmitting a sound signal, for instance, is able to give bystanders a more precise signal about an approaching danger than a sound signal representing the prior art and coming from upper structures of the crane.

One task of the controller is controlling the charge level of the energy storage, in the same way as in the case of an intelligent accumulator charger. In addition to controlling the charge level of the energy storage, it is preferable for the controller to be arranged to prioritize energy consumption devices and, when the charge level is low, to restrict power feed to the energy consumption devices of lower priority categories.

BRIEF DESCRIPTION OF THE FIGURES

The invention will now be described in greater detail with reference to the accompanying drawings, in which the same reference numerals or signs refer to the same elements. The first number in a two-part reference numeral, for instance 1-10, indicates the figure in the context of which the element indicated by the reference numeral is described for the first time, and the description will not be repeated in connection with the following figures. The drawings and the related explanations are intended to illustrate but not restrict the invention. In the drawings:

FIG. 13 is a schematic representation of techniques boosting the collection of energy from short hoisting or lowering movements.

DETAILED DESCRIPTION OF PARTICULAR EMBODIMENTS

Figure 1:
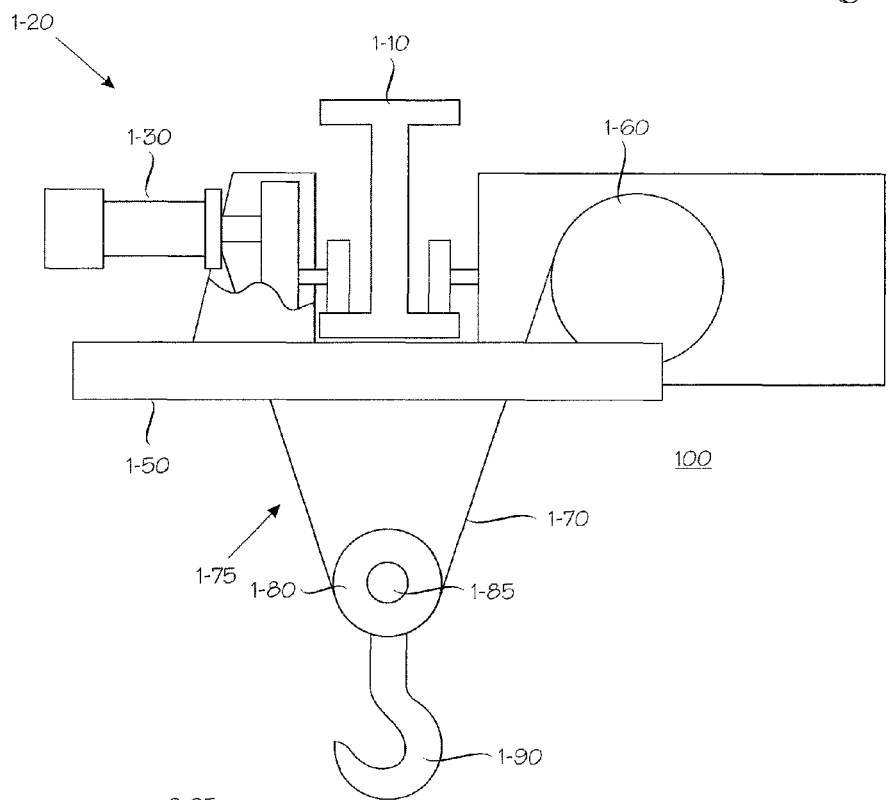
FIG. 1 shows the main parts of a crane.

FIG. 1 shows the main parts of an exemplary crane. The hoisting machine is generally denoted by reference numeral 100. In this example, the crane frame comprises a girder 1-10, in the longitudinal direction of which travels a trolley 1-20 driven by a motor 1-30. The body 1-50 of the trolley supports a hoist motor 1-60, which lifts and lowers, via tackle 1-70, elements indicated generally by reference numeral 1-75 and comprising a sheave arrangement 1-80 and a load-fixing means 1-90 rising and lowering with it, such as a hook, clamshell or catch. Many conventional elements of the hoisting machine, such as different rope drums, are not described in more detail. From the point of view of the invention, the most interesting element is the sheave arrangement 1-80 described in more detail in FIG. 2. Reference numeral 1-85 denotes the shaft of the sheave system.

Figure 2:
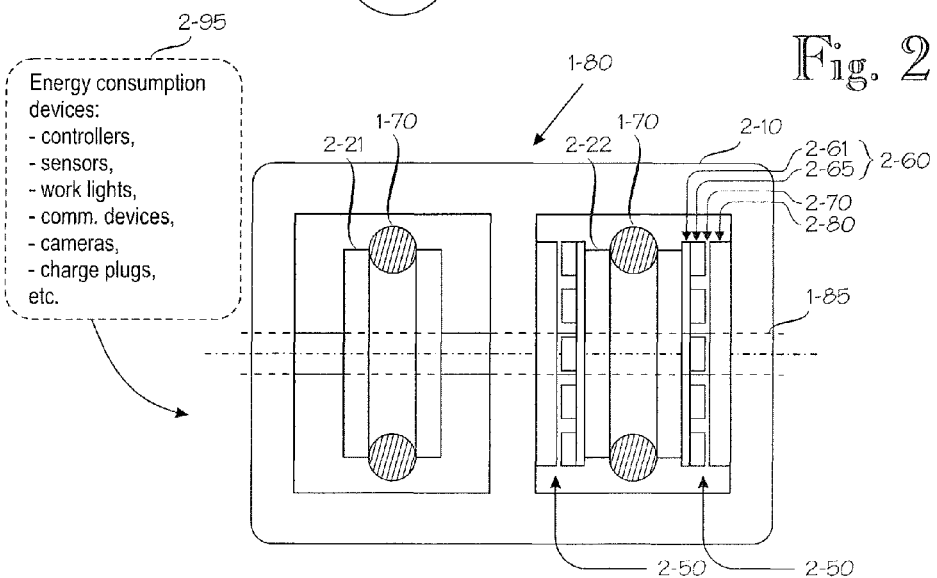
FIG. 2 shows positioning the parts of an energy collector in a load-fixing means provided with a sheave in accordance with an embodiment of the invention.

FIG. 2 shows positioning the parts of an energy collector in a load-fixing means provided with a sheave in accordance with an embodiment of the invention. FIG. 2 shows a top view of the sheave system 1-80. The sheave system comprises, in this example, a framework 2-10 and a shaft 1-85 supported against it. The shaft 1-85 supports two sheaves 2-21 and 2-22. In this example, on both sides of the sheave 2-22 in the direction of the shaft 1-85, there are generators indicated generally by reference numerals 2-50. Depending on the energy requirement and the capacity of the generators, the generators 2-50 may be positioned on one side or both sides of one or more sheaves. The main parts of the generator 2-50 are a rotor 2-60, a stator 2-80 and an air gap 2-70 separating them. In this example, the rotor 2-60 is rigidly attached to the sheave 2-22. The stator 2-80 is correspondingly rigidly attached to the framework 2-10 of the sheave system. Rigid attachment means that rotation of the rotor along with the sheave 2-22 is not based on mere friction, as in the solutions such as a bicycle dymamo. However, rigid fastening does not exclude the possibility of the generator 2-50—i.e. the rotor 2-60 and the stator 2-80— being retrofittable and detachable for instance for maintenance.

In this example, the generators 2-50 are axial flux generators, which means that their main flux passes in the direction of the axis of revolution of the rotor. With regard to this invention, the main advantage of axial flux generators is a greater power density and a flat size, compared with a radial flux machine. The rotor 2-60 of the axial flux generator is formed of a rotor plate 2-61 and permanent magnets attached to it, indicated generally by reference numeral 2-65. In the case of a sheave, the magnets 2-65 may alternatively be attached directly to the sheave 2-22.

The stator 2-80 has a winding in which, when the sheave 2-22 and, at the same time, the magnets 2-65 are rotating, a voltage is induced, which, in turn, results in current generated by the generator 2-50. The energy generated by the generator is modified (rectification) in the ways required by the charging voltage of the devices connected to the energy collector and/or of the accumulator. Such modification may include, for instance, rectification, filtering and regulation of the charging voltage.

Reference numeral 2-95 denotes generally energy consumption devices to be positioned in connection with the hook, such as various sensors, data acquisition devices, controllers, lamps, signal devices, communication devices, charging plugs etc.

Figure 3:
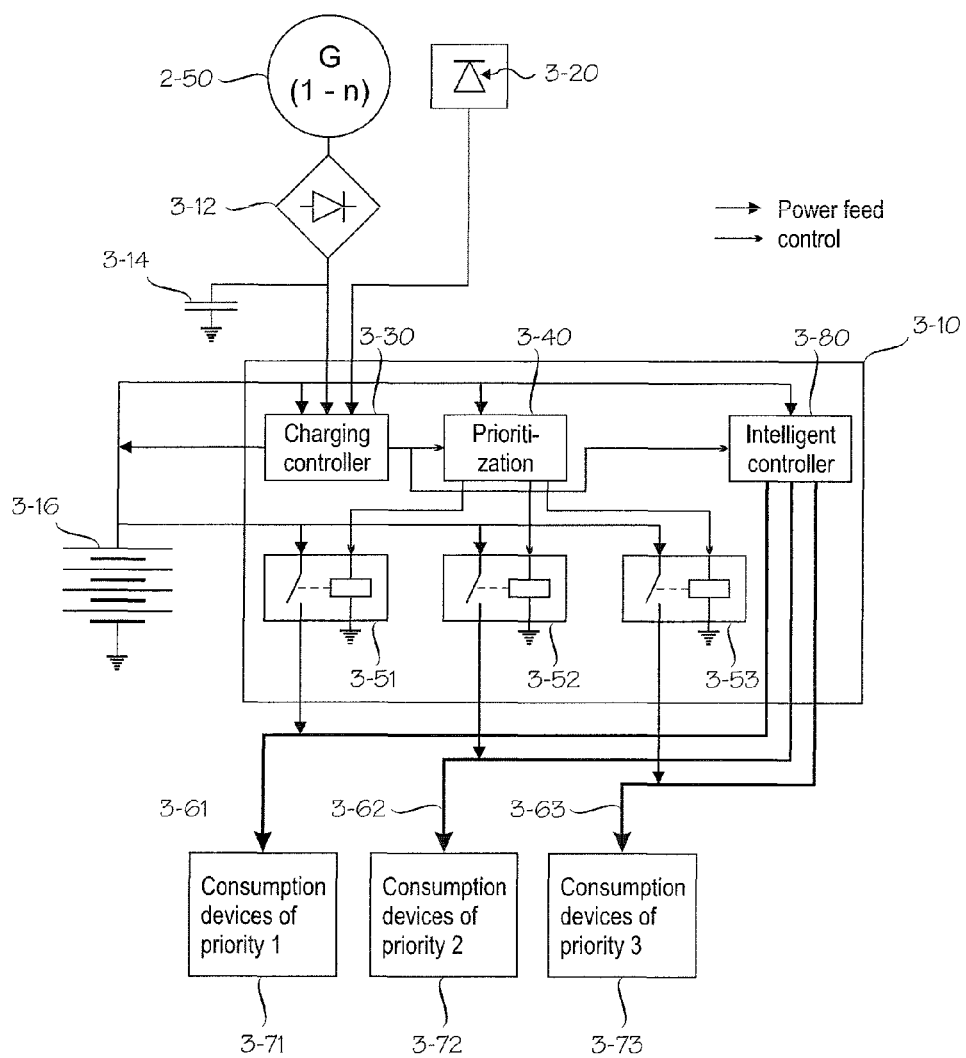
FIG. 3 shows a block diagram of the electric parts of an energy collector according to the invention.

FIG. 3 shows a block diagram of the electric parts of the energy collector in accordance with an embodiment of the invention. The energy collector includes a controller 3-10 comprising at least a charging controller 3-30. The charging controller receives electric energy from one or more generators 2-50 via rectification 3-12 and filtering 3-14. The charging controller supplies power to electric energy storage 3-16 which comprises, in this example, one or more accumulators. Instead of or in addition to an accumulator, for instance a supercapacitor may be used as the energy storage. The accumulator 3-16 supplies power to the other possible elements of the controller 3-10, which may include, for example, prioritization logic 3-40 and/or an intelligent controller 3-80. The prioritization logic 3-40 monitors the charge level of the accumulator 3-16. On the basis of the charge level of the accumulator, the prioritization logic 3-40 may control switches 3-51 . . . 3-53 and, via them, switch the power feed on in one or more peripheral buses 3-61 . . . 3-63. Sensors, meters, communications devices etc. may be connected to the peripheral buses 3-61 . . . 3-63. Reference numerals 3-71 . . . 3-73 indicate generally consumption devices of priority categories 1 to 3. The number of peripheral buses 3-6x, switches 3-5x and the like—in this example three—is naturally only an arbitrary example. When the accumulator 3-16 has a high charge level, the prioritization logic 3-40 controls the switches 3-51 . . . 3-53 to feed power to all peripheral buses 3-61 . . . 3-63. When the charge level of the accumulator falls, the power feed of peripheral buses 3-61 . . . 3-63 may be interrupted, or it may be restricted for instance periodically. One example is represented by a camera and a transmitter which are installed in connection with the hook 1-90 (not shown separately) and which, when the charge level is high, continuously shoot and transmit onwards the view below the hook 1-90. When the charge level falls, shooting and transmitting image may be changed to take place periodically, and when the charge level falls even more, they can be stopped altogether. A second example is represented by a working lamp which is installed in connection with the hook 1-90 and whose energy supply may be stopped when the charge level of the accumulator falls.

A third example is represented by a load-weighting sensor in connection with the sheave arrangement 1-80 of the hook 1-90. Using a weighting sensor in the hook gives a more accurate weighing result than measurement via upper and electrified structures of the crane because positioning the weighting sensor in connection with the hook excludes several sources of error, such as swaying of the load, changing rope angles, unsupported length of the ropes etc.

As a fourth example, an acceleration sensor can be mentioned which is capable of measuring accelerations in several directions. The measurement data produced by the acceleration sensor may be transmitted wirelessly to the crane control system (not shown), which controls the movements of the crane in the longitudinal and transverse directions. The arrangement enables so-called anti-sway of the load. Further, the acceleration sensor allows the collisions subjected to the hook to be measured, and the data may be registered in a data acquisition device integrated in the hook structure itself or, alternatively, it may be transmitted to the crane control system and/or remote monitoring.

Yet another example is represented by a state monitor which monitors wireless data transfer to the crane control system. Since electric energy is available from the energy storage, the state monitor can raise an alarm when the connection to the crane control system is broken in a case where the power supply has been broken to the crane control system itself. Then, an electrician can be called quickly to keep the expensive production downtime short.

Figure 4:
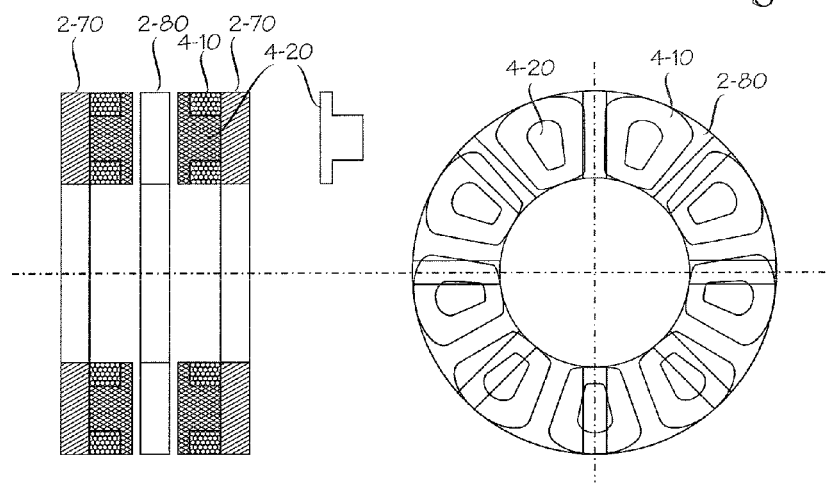
FIG. 4 shows a cross-section of an axial flux generator.

FIG. 4 shows a cross-section of an axial flux generator. Axial flux generators deviate from radial flux generators representing a more conventional type in such a way that their magnetic flux is in the axial direction of the machine. An advantage is that an axial flux generator can be fitted to a small space. FIG. 4 shows an implementation of an axial flux generator as having two sides, whereby one rotor plate 2-80 magnetizes two stators 2-70. It is obvious that an axial flux generator may also be implemented as having one side, whereby one of the stators 2-70 is left out. Stator winding 4-10 is, in this example, conventional winding made in slots. Reference numerals 4-20 show the 'teeth' of the winding, around which the winding is formed. Different implementations of the rotor are shown in FIG. 5.

Figure 5:
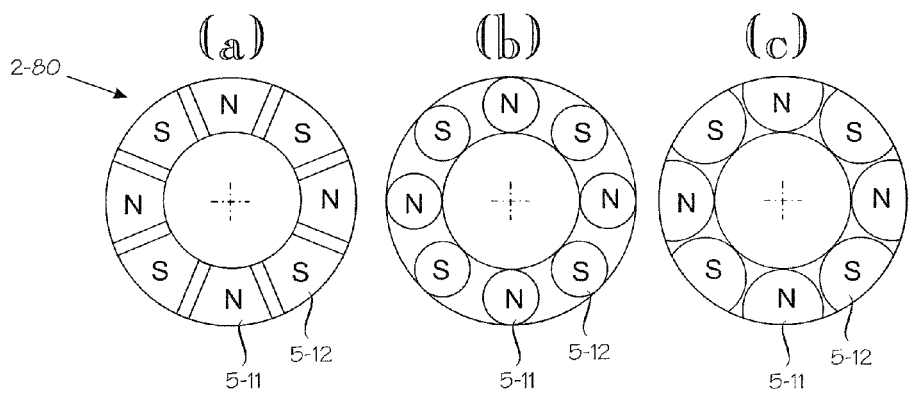
FIG. 5 shows some feasible configurations of a rotor in an axial flux generator.

FIG. 5, which consists of partial FIGS. 5(a), 5(b) and 5(c), shows some feasible configurations of the rotor of the axial flux generator 2-80. N and S denote magnets 5-11, 5-12, of which the north pole or the south pole of the magnet, respectively, face the viewer. In FIG. 5(a), the magnets have the shape of sectors of a circular ring ('trapezia'), in FIG. 5(b) the shape of circles, and in FIG. 5(c) the shape of half-circles. The magnets 5-11, 5-12 may be embedded in the rotor plate or mounted on its surface.

Figure 6:
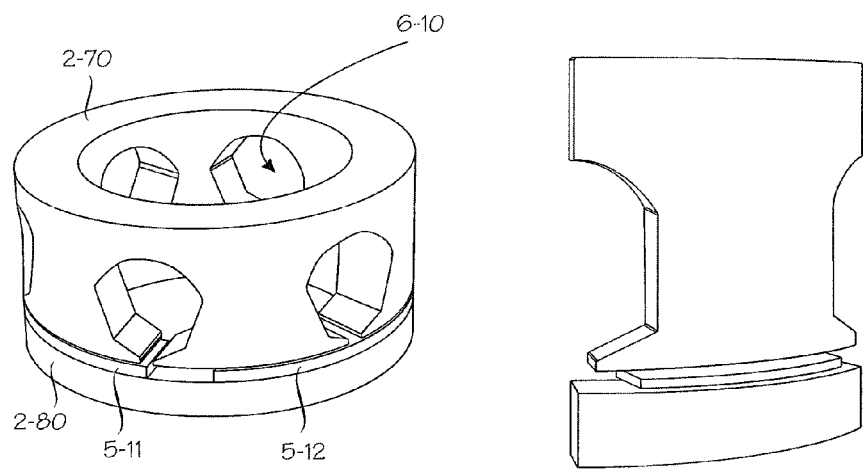
FIGS. 6 and 7 illustrate modelling and optimization of an axial flux generator.
Figure 7:
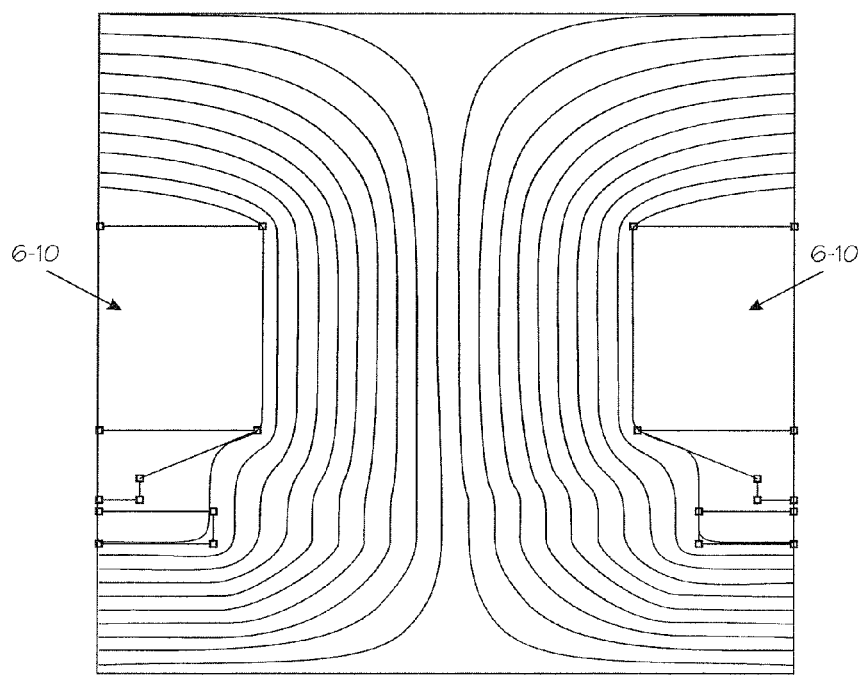

FIGS. 6 and 7 illustrate modelling and optimization of an axial flux generator. FIG. 6 illustrates three-dimensional and FIG. 7 two-dimensional modelling. Several parameters, such as magnetic circuit, stray flux of slots, stray flux of winding overhangs etc., can be modelled from electric machines; as from axial flux generators in this case. In connection with implementing a prototype of this invention, the counter electromotive force (EMF) generated by the machine was modelled. EMF may be modelled by, for example, rotating the rotor of the axial flux generator and by calculating or measuring the EMF induced in the windings of the stator. As a result of the modelling, a six-pole machine was selected having a winding wire strength of about 1 mm. Reference numeral 6-10 indicates stator slots in which the stator winding 4-10 is installed.

Figure 8A:
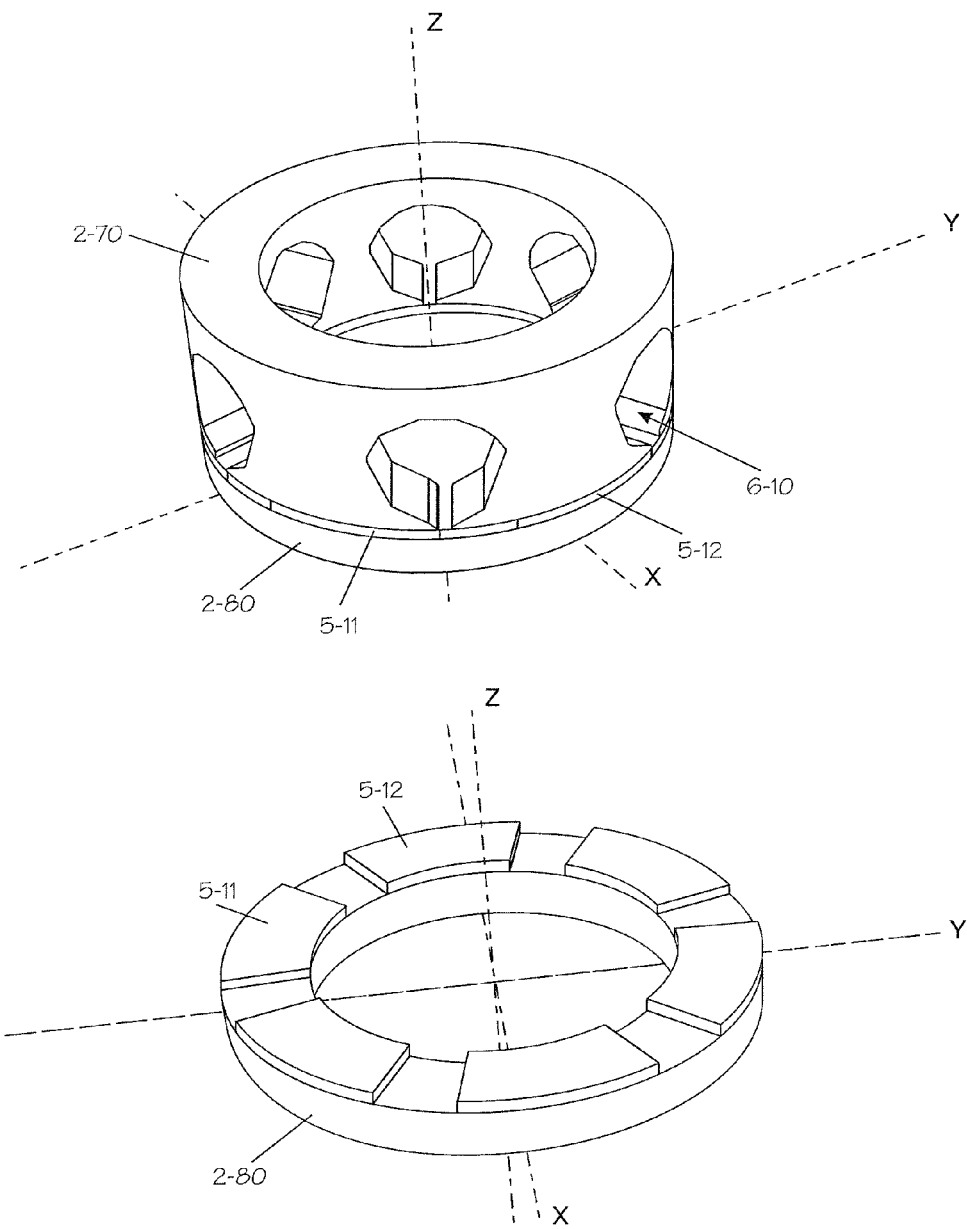
FIG. 8A shows, in greater detail, a prototype of an axial flux generator, selected as a result of modelling, and particularly the geometry of stator slots.

FIG. 8A shows, in greater detail, a prototype of the axial flux generator selected as a result of modelling, and particularly the geometry of the stator slots 6-10. In this prototype, the axial flux generator has six poles, and the magnets 5-11, 5-12, which were mounted on the surface of the rotor, are sectors of a circular ring ('trapezia'), as shown in FIG. 5(a). The stator slots 6-10 have an oval shape.

Figure 8B:
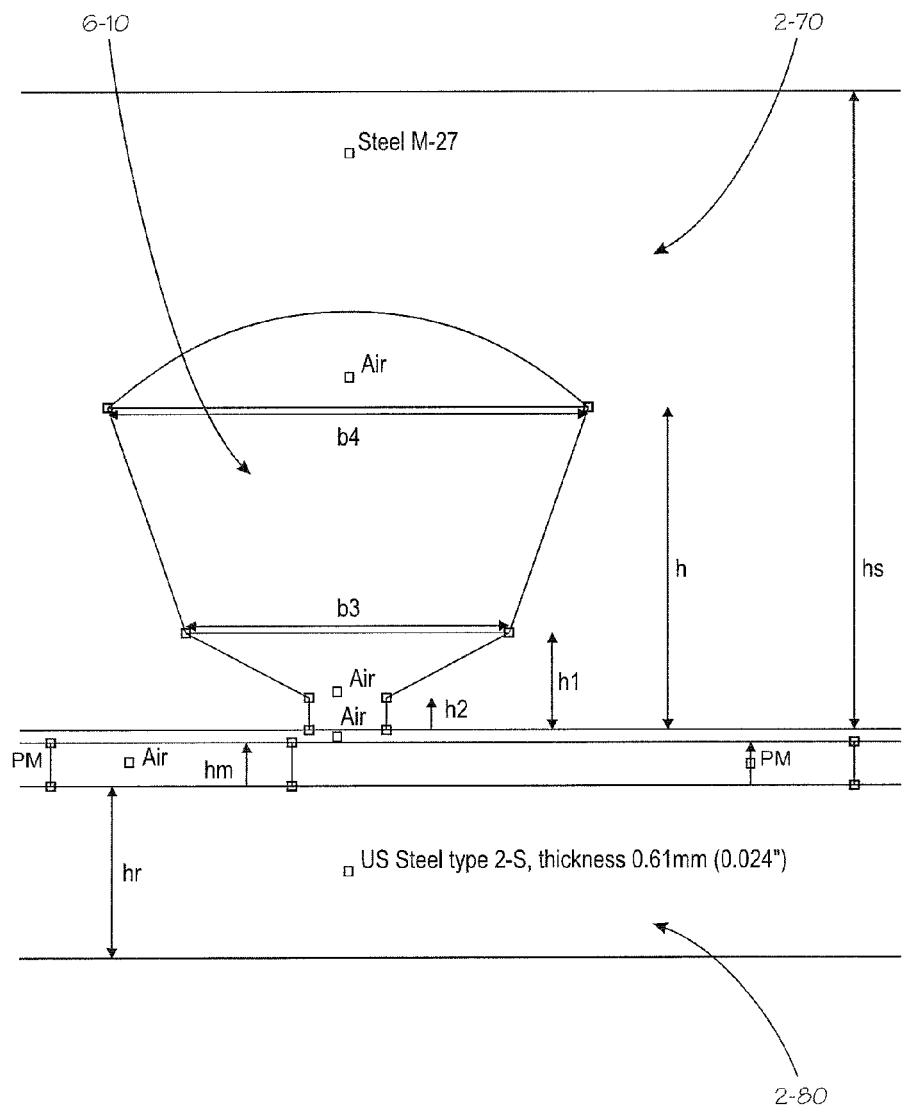
FIG. 8B shows, in greater detail, the geometry of stator slots.

FIG. 8B shows, in greater detail, the geometry of the stator slots 6-10. In FIG. 8B, 'Air' means an air gap, and 'PM' means permanent magnets (elements 5-11 and 5-12 in FIGS. 5 to 8). In the prototype, the number of pole pairs np=6, and the other essential dimensions are as follows:
Outer diameter Dout=210 mm
Inner diameter Din=145 mm
Stator wire Cu, $\phi$=1 mm, turns 2,300, R1=20$\Omega$
Height of permanent magnets hm=5 mm
Rotor plate thickness hr=20 mm
Stator height hs=74.4 mm
Slot dimensions: h=37.2 mm; h1=11.15 mm; h2=37.2 mm; b3=46.5 mm; b4=55.8 mm.

In this prototype, the stator body is of steel, of the type M-27, and the rotor body is a packet laminated of steel plates, the steel being of the type US Steel S-2.

Figure 9A:
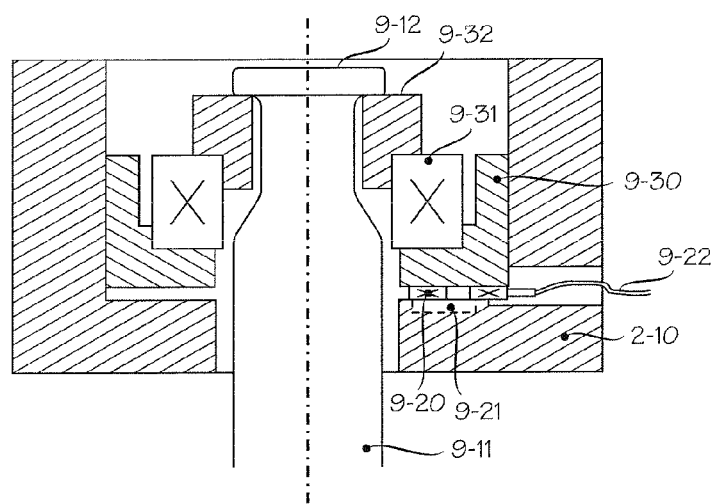
FIGS. 9A to 9B show an example of fixing a hook and of positioning sensors, seen from the side and from the above, respectively.
Figure 9B:
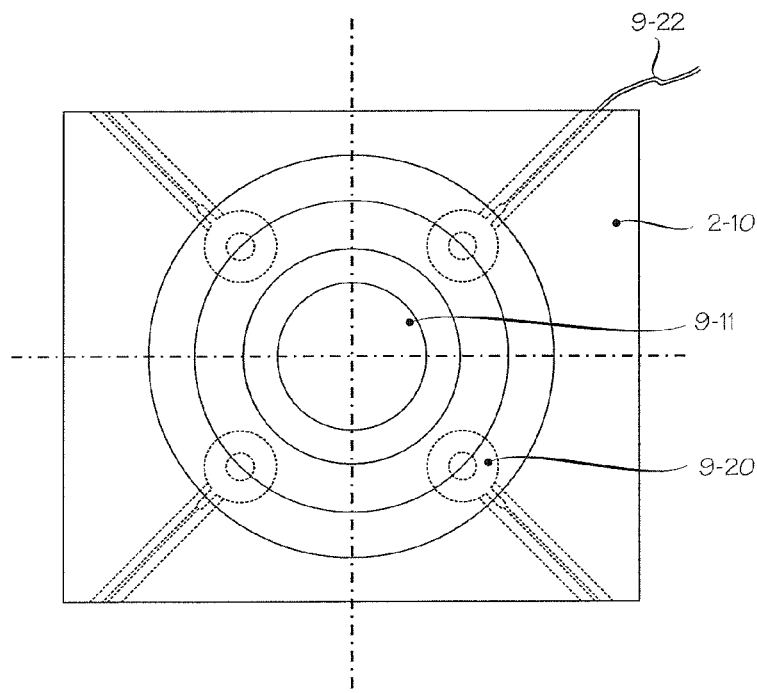

With reference to FIGS. 9A and 9B, one exemplary structure applicable to measuring a load may be implemented with several weighting sensors, such as with three or four strain-gauge sensors positioned in connection with the bearing of a hook arm 9-11. Even if the loading of the hook 9-10 were eccentric, it is still possible to achieve reliable measurement by means of several sensors 9-20 which are to be positioned at corners of such a polygon that the hook arm 9-11 or suspension of another type remains inside this polygon. This means that even in the case of eccentric loading, the sum of the measurement results of the weighting sensors corresponds to the weight of the load. More precisely, the sum of the measurement results of the weighting sensors corresponds to the combined weight of the load and the hook but the weight of the hook or another load-fixing means can be subtracted by calibration or postprocessing.

The sensors 9-20 are preferably selected in such a way that commercial sensors are arrangeable in hollows 9-21 shaped for them in a bearing ring 9-30. The sensor types may, as a rule, be standardized, and the sensor-carrying bearing ring 9-30 with its hollows 9-21 shaped for the sensors is machined in accordance with the dimensions of the hook 9-10. Thus, customization with its various working stages and also with regard to dimensioning can be minimized. Further, the existing hook 9-10 can be utilized without any changes to it, the hook 9-10 frequently being a forged part and thus a valuable part. This structure does not cause any essential change in the hoisting height used because the outer dimensions of the load-fixing means remain, in practice, the same. Upon the sensors 9-20 placed on the bearing ring 9-30, a bearing 9-31 is mounted, and upon that, a locking ring 9-32. The hook arm 9-11 is arranged through all of these, and a flange 9-12 in its upper part loads the locking ring 9-32 from above when the hook 9-10 is loaded by the gravitation of the load. The sensors 9-20 are, in addition, protected against external dents. While the hook 9-10 is rotating, wiring 9-22 of the sensor remains immovable irrespective of the rotating movement.

In positioning the generator 2-50 in the framework 2-10 carrying the hook, it is preferable for the use of space that the space between the sheaves 2-21, 2-22 be utilized. With regard to this intermediate space, it is preferable to utilize the space above the shaft 1-85 of the sheaves, whereby the outer dimensions of the framework 2-10 do not have to be essentially enlarged, for instance past the width of the sheaves 2-21, 2-22. The space between the sheaves 2-21, 2-22 below the shaft 1-85 is mainly reserved for the hook 9-10 and the structures supporting the load.

With reference to FIGS. 9C to 9K, the following structures may be used, by way of example, in the generator 2-50. In the rotor 2-60, the magnets 2-65 may be positioned on the whole rim of the rotor 2-60, covering the whole arc of 360 degrees, and the empty space remaining between the magnets is naturally taken into account. As described above in regard of the use of space of the framework 2-10 carrying the hook 9-10, the stators 4-10/4-20 may be positioned in the space above the shaft 1-85 of the sheaves, for example in a space of about 180 degrees to form a semi-circle. Then, the distance of transfer for wirings 9-16 in this overhead space is short from the stators 2-80 themselves to the energy storage 3-16 and consumption devices 2-95, as these are also, for the most part, positioned in the above-mentioned overhead space. Short wirings contribute to ensuring small voltage losses.

Figure 9C:
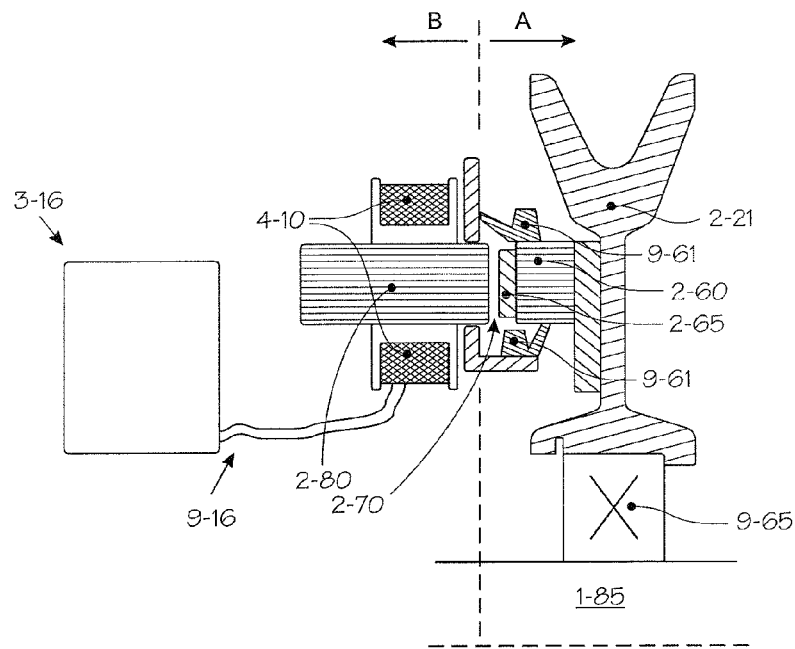
FIG. 9C shows, by way of example, a magnet in connection with the bearings of a sheave, a corresponding stator, and a dust seal between them, for instance a two-sided V lip seal, seen in a cross-section from the side.
Figure 9D:
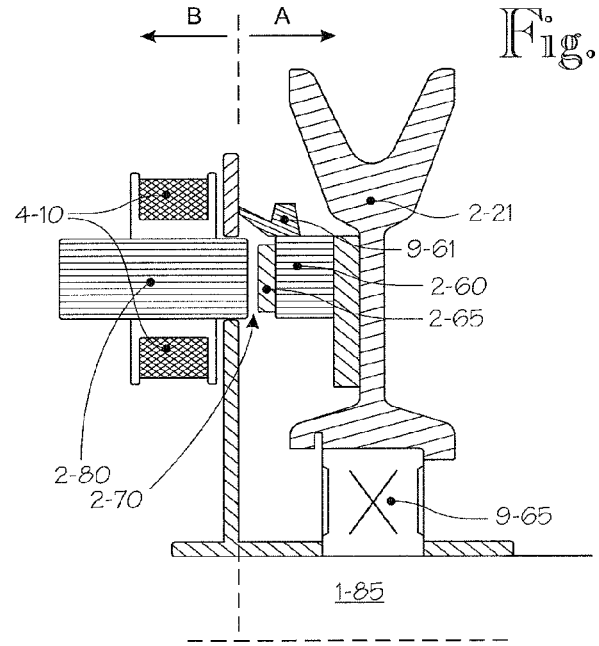
FIG. 9D is a modification of the embodiment of FIG. 9C in such a way that the V lip seal is one-sided.
Figure 9E:
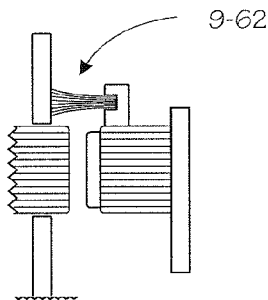
FIG. 9E is a modification of the embodiment of FIG. 9D in such a way that the seal is a brush seal.
Figure 9F:
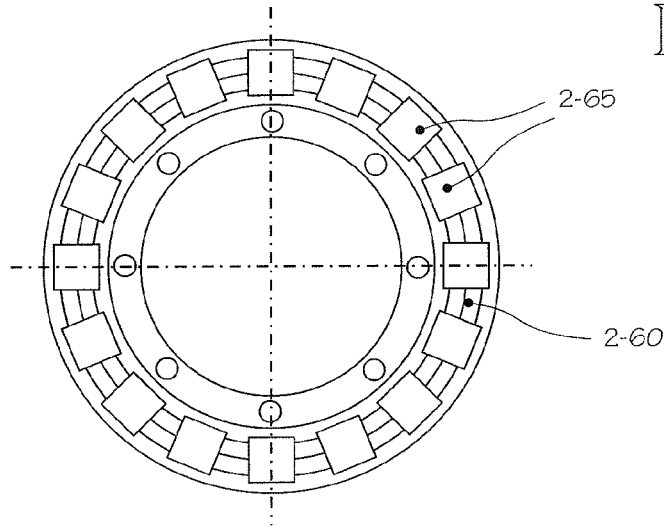
FIG. 9F shows an example of positioning magnets on a sheave.
Figure 9G:
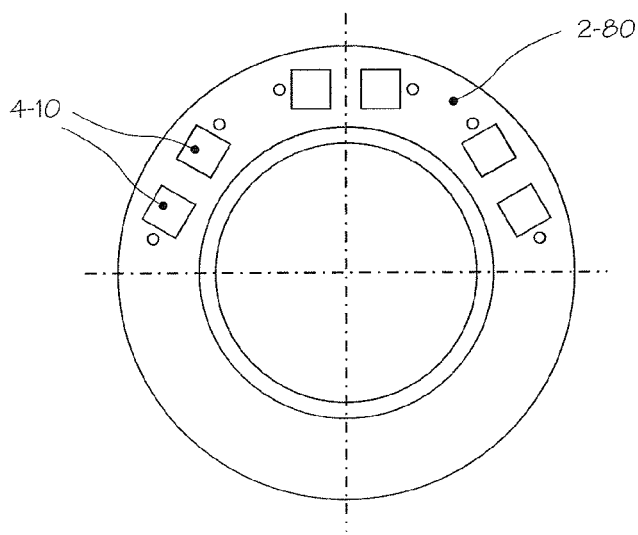
FIG. 9G shows an example of positioning stators in a semi-circle.
Figure 9H:
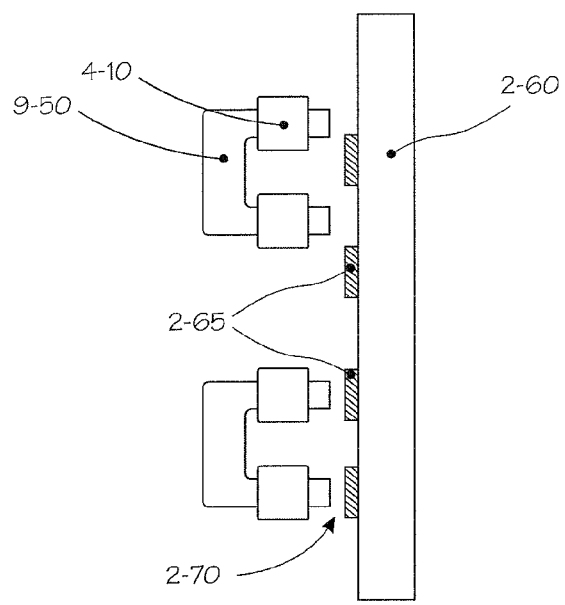
FIGS. 9H and 9I show an example of positioning windings on a U-shaped magnet.
Figure 9I:
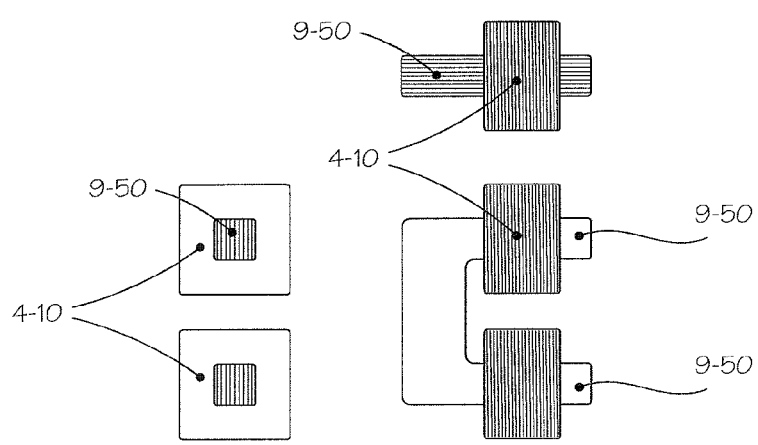
Figure 9J:
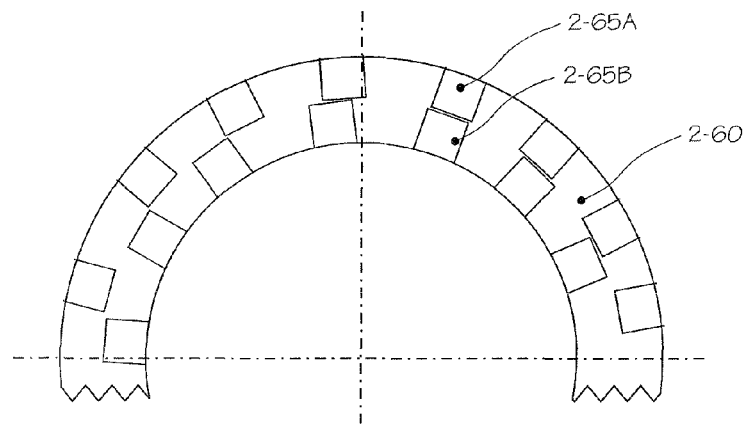
FIGS. 9J and 9K show examples of positioning and distribution of magnets on a sheave, seen from the side.
Figure 9K:
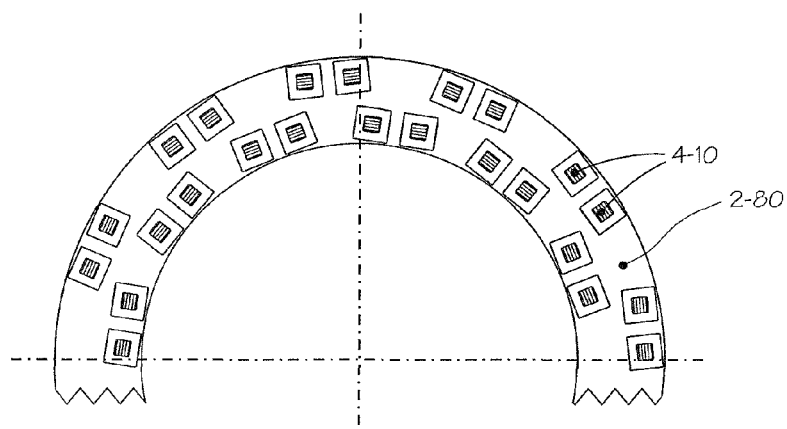

With reference to FIGS. 9J and 9K, to even out the cyclic rotation resistance caused by rotation of the generator 2-50, rotor magnets 2-65 and stator poles 4-10/4-20 may also be positioned on several rims which are substantially concentric. For instance, the magnets 2-65A on the outer rim may be positioned in such a way that they are at the point of the spaces between the magnets 2-65B of the inner rim. Thus, cyclic steps can be made less noticeable, and operating (rotating) the generator 2-50 is more even. Furthermore, several magnet-stator pairs are positionable on the rim, whereby generation of electricity can be increased. By means of the same staggering principle, magnet-stator pairs may be on more than two concentric rims.

Cyclicity may also be decreased in such a way that the stator-magnet pairs are not positioned to be quite accurately cophasal, whereby they do not cause rotation resistance quite simultaneously. Positioning on several rims may also be utilized as described earlier. Minimizing cyclicity may thus be performed physically by positioning energy-generating elements of the generator reciprocally in such a way that the energy pulses can be staggered at least partially relative to each other.

With reference to FIG. 9I, in the structure of the stators it is possible to utilize, by way of example, a structure where separate windings 4-10 have been passed for the two branches of a U-shaped magnet 9-50. The magnet 9-50 represents one feasible implementation of the stator pole or tooth 4-20 described in the context of FIG. 4, around which it is easy to arrange the windings 4-10 in a modular manner. The winding 4-10 is shaped to fit around the cross-section of a branch of the U-shaped magnet 9-50. The windings 4-10 are thus ready-made modules which are electrically connected to the energy storage 3-16. The U-shaped magnet 9-50, in turn, may be made of a steel plate. When the magnet-stator pairs are modular, a desired output level of electric energy can be selected case-specifically by means of the number of modules.

With reference to FIGS. 9C to 9E, the generator 2-50 has, between the rotor magnets 2-65 and the stator 2-80, a small air gap 2-70 in order for the rotor 2-80 to rotate. Arrows A and B indicate elements on the side of the rotor and on the side of the stator, respectively, relative to the air gap. To protect this air gap 2-70 and, at the same time, the energy storage 3-16, it is preferable to provide the generator 2-50 with dust protection, which may be implemented in the shape of a circle, for instance. The dust protector may be, for example, a lip seal 9-61 with a V-shaped cross-section. FIGS. 9C and 9D indicate a two-sided and a one-sided V lip seal 9-61, respectively. FIG. 9E shows a one-sided brush seal 9-62 where the bristles extend substantially in the axial direction. A one-sided seal is sufficient against impurities from outside. A two-sided seal also gives protection against bearing grease, for example, which may push into the air gap from the direction of the shaft 1-85, i.e. from the inside of the structure, for instance from a bearing denoted by reference numeral 9-65.

A V lip seal primarily gives protection against industrial dust as well as dirt, grease and metal scale detached from the ropes of the hoisting apparatus, in other words primarily against impurities from the outside so that the impurities cannot get into the air gap 2-70. The structure may be also supplemented with a second V lip seal or brush seal, which is intended to give protection against grease or the like possibly arriving from the shaft or the bearing. The protection allows impurities to pass in the radial direction outwards from the air gap, or in the axial direction away from the air gap, and simultaneously it tends to prevent impurities from getting into the air gap, for example. It is to be noted that the framework 2-10 of the sheave system is normally subjected to external and internal forces, temperature variations, impacts etc., which the framework is dimensioned to withstand. It is challenging to install, in such an environment, machinery which works accurately, does not require special maintenance and provides reliable operation despite stresses and exposures. Protection is installed for instance on one side or both sides of the web plate in the sheave 2-21, 2-22. It is feasible to provide the sheave 2-21, 2-22 with protection as a prepared element which is easily retrofittable in an existing crane. Attaching the protection may take place with, for example, glue or two-sided adhesive tape.

Figure 9L:
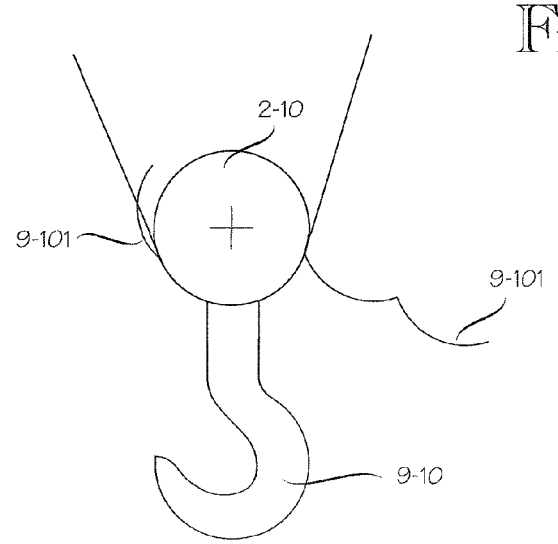
FIG. 9L shows an example of improving protection.

With reference to FIG. 9L, detachable protectors 9-101 may be arranged around the framework 2-10 to protect the upper space, in particular. The protectors 9-101 may be completely detachable for maintenance, testing or mounting of auxiliary equipment, or they may be hinged in such a way that they can be left opened in a lowered position, for example. It is feasible to provide the protectors with, for example, perforated openings in advance to enable attachment of auxiliary equipment to be mounted later on.

Figure 10:
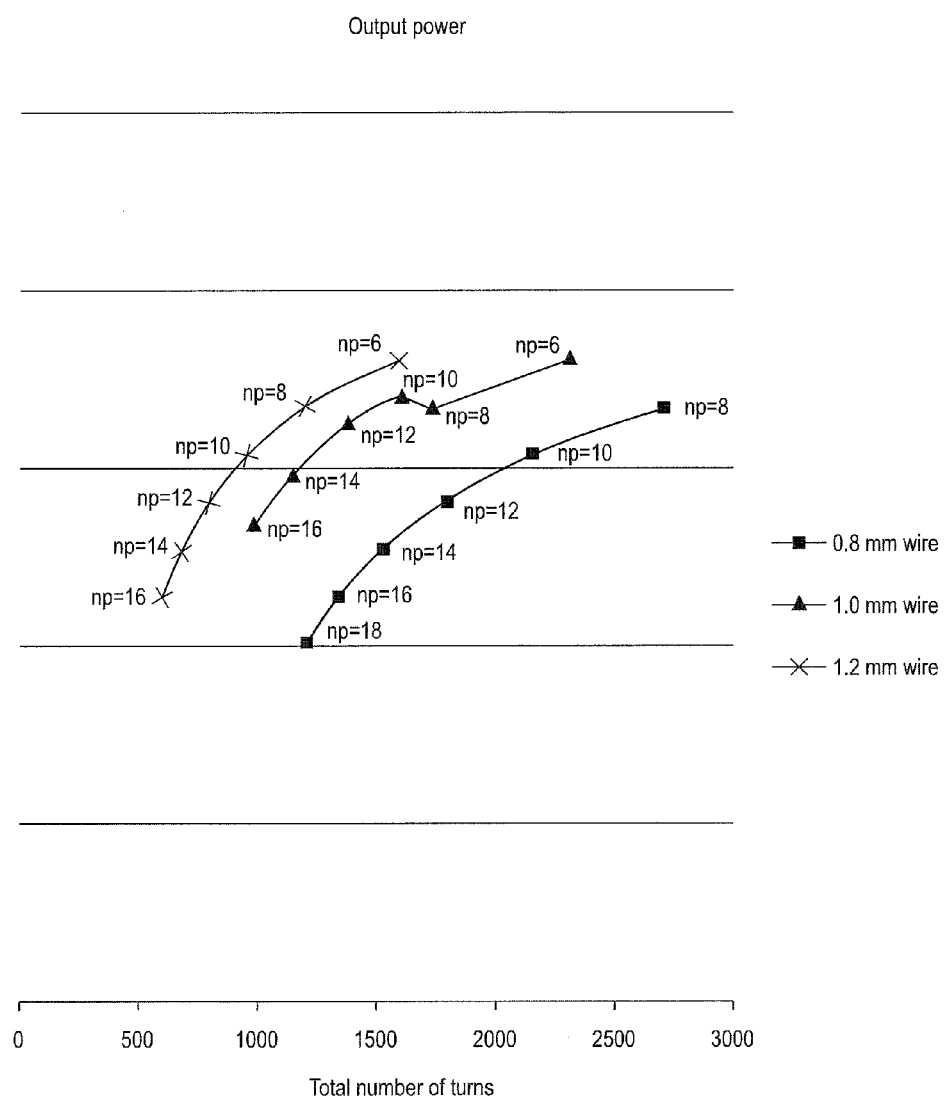
FIG. 10 shows output power generated by a prototype of an axial flux generator with different winding wire thicknesses.

FIG. 10 shows output power generated by a prototype of an axial flux generator with different winding wire thicknesses, in a function of the number of turns, the other dimensions being the same as in FIG. 8B. In accordance with a specific embodiment, the operation of the generator is adaptive, whereby the logic of the local controller may be based on, for example, the amount of available energy and/or the energy requirement (for use or storage). An appropriate structure and control allows the output to be controlled between the minimum and the maximum with suitable steps. Also, two-phase charging may be carried out in the structure in such a way that a low-output generator gives a sufficiently high current and power for an actuator to select the point when a higher-output generator is to be switched on. The low-output generator correspondingly gives little resistance to a sheave in a sheave system. Energy output is thus based on detecting a threshold power, and the detection with an intelligent actuator is correspondingly based on the fact that energy is available directly or via energy storage. Connecting generators to produce electric energy may be done by freewheel clutches, electromagnets and/or solenoids positioned between the generators. These devices used for connecting may, in turn, be electrically and/or magnetically insulated, so that the operation of the generators will not be disturbed and, correspondingly, that the generators will not disturb the devices used for connecting. Also increasing or calculating the number of pole pairs may be used for power control of the generator, for instance by means of electronics. Thus, power control is feasible even if there were only one generator in operation. Naturally, variation in the number of pole pairs and connecting several generators may occur in parallel, in other words they do not exclude one another. Then, power can be controlled in a wide control range.

Rating the electric power is affected by, for example, the number of pole pairs and the selection of the stator wire. The thicker the stator wire, the smaller the power loss in the stator. On the other hand, a thicker stator wire requires a greater stator slot. Also increasing the number of turns increases the output power obtained. The output power for a single-phase, machine can be calculated from the following formula:

$$P_{out}=(E_f-R_1I_1)I_1=E_fI_1-R_1I_1^2$$

E, I and R are phase-specific variables, and the power of n phase machine is n times the power of one phase.

Figure 11:
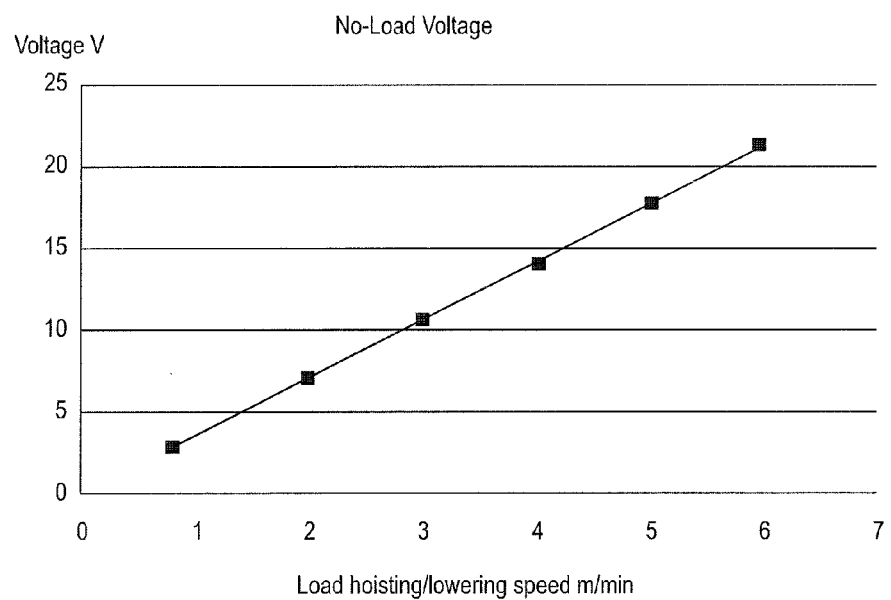
FIG. 11 shows the dependence of output voltage on the rotation speed in the case of a prototype of the invention described in connection with FIGS. 6 to 8.
Figure 11:
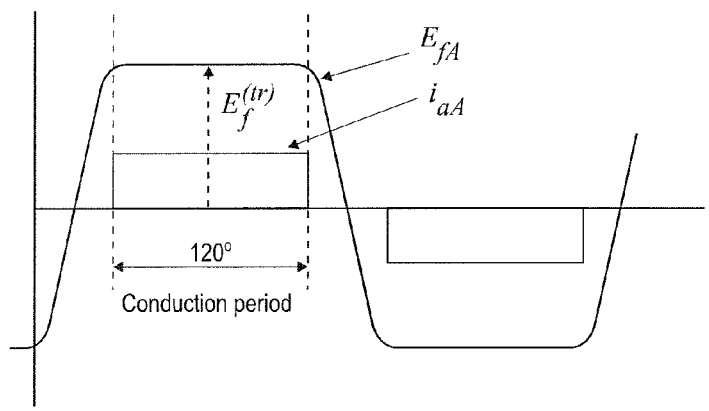

FIG. 11 shows the dependence of the induced voltage on the rotation speed in the case of a prototype of the invention described in connection with FIGS. 6 to 8B. The voltage is directly proportional to the rotation speed of the rotor. If the rotor is rigidly attached to the sheave, the rotation speed of the rotor is the same as that of the sheave, which, in turn, is determined from the hoisting or lowering speed of the load, effective radius of the sheave and transmission of the tackle (1:2, 1:4 etc.).

In accordance with an embodiment, non-slip transmission may be arranged between the sheave and the rotor, implemented for instance by tooth wheels or a tooth belt. Such non-slip transmission may increase the rotation speed of the rotor and thus increase output of electric energy. Particularly with regard to retrofitting an energy collector according to the invention in an existing crane, it is preferable to implement the generator in such a way that installing the generator does not significantly change the centre of gravity of the hook, whereby, even when empty, the hook block can be made hang vertically.

The transmission may be constructed in such a way that the rotor rotates on the same shaft or extension of the shaft line as the sheave, or the rotation centre of the rotor deviates from that of the sheave. The transmission may be preferably performed with plastic tooth wheels, for instance. One implementation is a solution where there may be, in parallel with the sheave rim, an internal tooth rim which is connected to the rotor shaft. The transmission ratio fulfils the requirement for increasing the rotation speed. The solution also allows the axial structure to be kept narrow. The structure surrounding the sheave with its protectors may be shaped in preferred cases in such a way that the generator(s) transmission, energy storage and consumption devices installed inside it are positioned in balance with the supporting ropes, so that even when empty, the hook block can be made hang vertically. It is to be noted that the equipment itself does not greatly deflect the centre of gravity but that the external structure protecting it and its shaping have a greater significance in positioning the centre of gravity.

When a rope is used which may slip in the sheave groove, the maximum output power of the generator is restricted by friction between the rope and the sheave, the friction depending, in turn, for instance on the load of the crane, i.e. the mass of the load. Subtracting the resistive losses and other loss components from the shaft power of the generator gives the power obtained from the generator:

$$P_{out}=P_{elm}-RI^2_A$$

When a given friction coefficient and load mass are assumed for the shaft, the mechanical power on the shaft can be calculated. This is, at the same time, the shaft power of the generator:
μ=0.3
m=20 kg
v=6 m/min
⇒ $P_{out}$≈3 W Most suitably, a new feature can be arranged in an existing sheave for instance by means of the following properties. The parts of the energy collector, i.e. the generator, controller and energy storage, may be modular. The magnets may be provided ready-made by, for example, a movable carrier, such as a foil or the like, with a suitable diameter, whereby moving and attaching the magnets by glue or two-sided adhesive tape, for instance, is relatively easy. To minimize the number of sheave sizes, a limited number of diameters may be used with inner bushings for sheave shafts of different sizes. With regard to the price, inner bushings are inexpensive. In addition, in the case of a sheave or hook, the whole hook block (the hook with its sheaves) can be completely replaced with a version where the energy collector with its auxiliary equipment is integrated. With regard to the mounting speed, the replacement can be done quickly because, in a preferred case, the hook block is replaced with a U-link hanging down in the rope by detaching the sheave shaft. Alternatively, the hook block is lifted to the upper position, for example onto a bridge crane, the rope is detached from its fixed end, the rope is threaded off through the old hook block, and the old hook block is replaced with a new one. The rope is reattached to the attachment of the fixed end. Replacing a hook block is also natural in connection with replacing a rope.

Figure 12A:
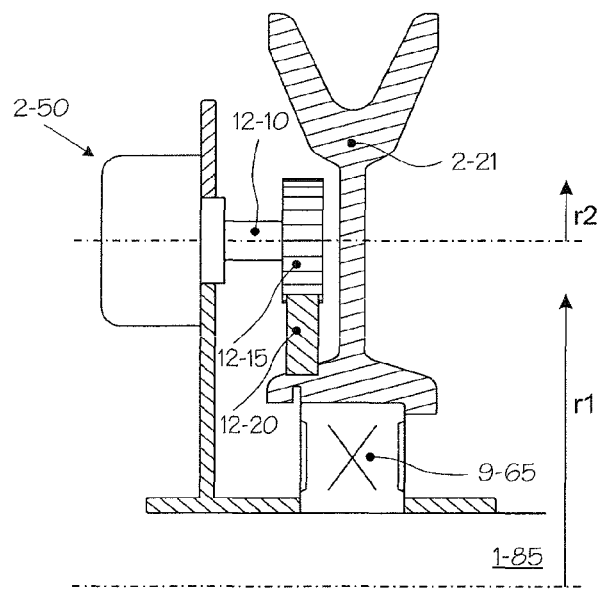
FIGS. 12A and 12B show examples of techniques for arranging, between the sheave and the generator, transmission which changes the rotation speed.
Figure 12B:
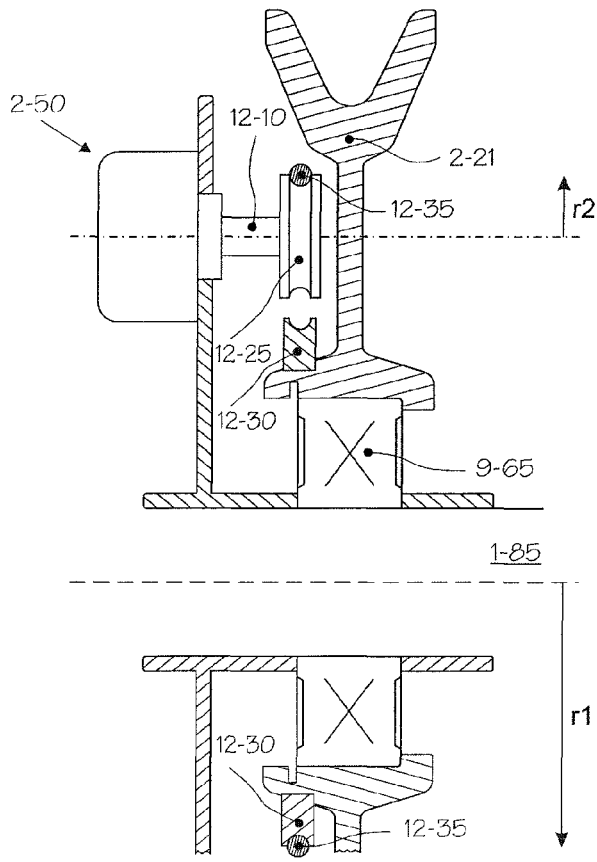

FIGS. 12A and 12B show examples of techniques for arranging, between the sheave and the generator, transmission which changes the rotation speed. Transmissions changing the rotation speed are known as such, but what is special in this context is primarily the utilization of the empty space in the cross-sectional profile of the sheave to implement a compact structure. Elements the reference numerals of which do not begin with '12-' have been described in the context of preceding figures, and the detailed description is not repeated.

FIG. 12A shows only that part of the profile of the sheave 2-21 which is above the shaft 1-85 in the figure. In this example, a shaft 12-10 of the generator 2-50 is provided with a wheel 12-15, for instance a tooth wheel which is rotated by a rim 12-20 which is joined to the sheave 2-21 and may be, in the case of the exemplary tooth wheel 12-15, for instance a tooth rim. The ratio of a radius r1 of the tooth rim 12-20 to a radius r2 of the tooth wheel 12-15 determines the transmission changing the rotation speed, being preferably in the range of 2:1 to 10:1, most preferably about 4:1 to 6:1. In other words, one revolution of the sheave rotates the generator by 2 to 10, most preferably 4 to 6 revolutions.

In the example of FIG. 12B, the shaft 12-10 of the generator 2-50 is provided with a belt pulley 12-25 operated by a belt 12-35, which is, in turn, operated by a larger belt pulley or rim 12-30 joined to the sheave 2-21. The transmission ratio r1:r2 is determined in the same way as in the example of FIG. 12A.

In some cases, the remaining problem may be collecting electric energy from very short hoisting or lowering movements. This remaining problem may be solved by storing energy to be collected from very short movements mechanically, and this mechanically stored energy is discharged to the generator in larger batches.

FIG. 13 is a principled schematic representation of techniques boosting the collection of energy from short hoisting or lowering movements. Elements described earlier are the rope 1-70, shaft 1-85, sheave 2-21 and generator 2-50. A broken two-way arrow 13-15 in connection with the sheave 2-21 indicates that the sheave 2-21 may make some short reciprocating movements. Collecting energy from short reciprocating movements is not efficient. To boost energy collection, the sheave 2-21 is arranged to rotate a ratchet mechanism 13-20, on the secondary side of which there are still short jerks, as shown by the arrow 13-25, but the movement is in one direction, not reciprocating. The ratchet mechanism 13-20, in turn, rotates mechanical energy storage 13-30, which is shown as a spiral spring in FIG. 13. In this context, 'mechanical' energy storage means that energy is stored before it is converted into electric form, as opposed to electric energy storage to be installed after the generator and typically having an accumulator.

When a given amount of energy has been accumulated in the energy storage 13-30, the accumulated energy is discharged to rotate the generator 2-50, the electric energy generated by which may be stored electrically, as described in connection with FIG. 3. In the example of FIG. 13, this takes place simply in such a way that the energy accumulated in the spring or other energy storage 13-30 is discharged to the generator 2-50 when the force generated by the energy storage exceeds the static friction of the generator 2-50. In practice, discharge of mechanical energy takes place when an impact or jolt directed at the sheave system makes the generator move.

Alternatively, between the energy storage 13-30 and the generator 2-50, there may be a clasp mechanism which prevents discharge of the energy storage and rotation of the generator until the force generated by the energy storage exceeds a threshold value required for opening the clasp. Such a clasp mechanism may be mechanically or electrically operated.

Those skilled in the art will understand that other kinds of energy storages may also be used. One alternative is a torsion spring, i.e. an elastic portion of the shaft 1-85. Energy may also be stored in the pressure of gas or liquid and/or in the potential energy of a piece or liquid. One example of collecting potential energy is mass which moves or rotates cyclically and which is transferred by short jerks towards the maximum value of potential energy, from which the mass passes towards the minimum value by itself.

Those skilled in the art will understand that instead of the ratchet mechanism 13-20, a gear system may be used which transforms both the hoisting and lowering movement of the crane into one-way rotating movement. However, the ratchet mechanism has, in addition to its simplicity, some surprising advantages. If the ratchet mechanism is installed in such a way that energy is collected in the lowering direction of the load, energy can be obtained "for free" because otherwise it would be difficult to exploit potential energy of the load. On the other hand, one remaining problem may be that the weight of an empty sheave system without any load does not generate sufficient friction against the rope 1-70 in order for energy to be collected. In such a case, it is more preferable to install the ratchet mechanism 13-20 in such a way that energy is collected in the hoisting direction of the load, so that the energy collector will not make the lowering of the empty sheave system more difficult.

It will be apparent to a person skilled in the art that as technology advances, the basic idea of the invention may be implemented in many different ways. The invention and its embodiments are thus not restricted to the examples described above but may vary within the spirit and scope of the attached claims.

The invention claimed is:

1. An apparatus for collecting energy in connection with a sheave system in a hoisting apparatus provided with a sheave system, the apparatus comprising:
    at least one generator comprising a rotor and at least one stator;
    wherein the rotor is connected rigidly to a sheave of the sheave system, and said at least one stator is connected rigidly to the sheave system such that when the load of the hoisting apparatus is rising or lowering, said at least one sheave rotates, whereby the rotor rotates simultaneously but the stator does not rotate, whereby electric energy is induced in the stator;
    electric energy storage;
    means for modifying the electric energy induced in the stator and for storing it in the electric energy storage; and
    means for supplying energy from the electric energy storage to at least one consumption device, wherein said at least one generator comprises rotor magnets positioned on several concentric rims in such a way that magnets positioned on different rims induce electric energy in the stator at different phases of the rotation movement of the sheave.

2. The apparatus according to claim 1, wherein said at least one generator is two-sided in such a way that one rotor magnetizes two stators.

3. The apparatus according to claim 1, wherein a separate generator is connected to each of the several sheaves.

4. The apparatus according to claim 3, wherein the separate generators produce different rotation resistances.

5. The apparatus according to claim 3, wherein the separate generators comprise a first generator and a second generator, of which the second generator has greater power output and rotation resistance than the first generator, and the apparatus further comprises selection means extracting power from the first generator to activate the second generator if the friction depending on the mass of the load allows it.

6. The apparatus according to claim 5, wherein at least one of the following pieces of data is used for activating the second generator: there is no slip between the rope and the sheave; the speed of the sheave; the torque of the sheave; and the weighing data on the load.

7. The apparatus according to claim 1, further comprising a solar panel and/or a wind generator for charging the electric storage irrespective of the movement of the sheave system.

8. The apparatus according to claim 1, comprising means for supplying energy from the electric energy storage to several consumption devices, and further comprising means for dividing said several consumption devices into several priority categories in such a way that when the energy storage is exhausted, the current supply of lower priority categories is restricted or completely prevented.

9. The apparatus according to claim 1, comprising at least one of the following energy consumption devices: sound signal device, warning light, working light, acceleration sensor, weighting sensor, mobile phone, camera, communications device, charging plug for an electric appliance, display, user interface, data collector.

10. The apparatus according to claim 1, comprising at least three weighting sensors for determining the weight of a load, wherein said at least three weighting sensors delimit a polygon inside which there remains a suspending point of a load-fixing means.

11. The apparatus according to claim 1, further comprising protection means for preventing impurities from passing to an air gap between the rotor and at least one stator.

12. The apparatus according to claim 11, wherein the protection means are arranged to prevent impurities from passing from the bearings on the axis of revolution of the sheave system to the air gap between the rotor and at least one stator.

13. The apparatus according to claim 1, which further comprises transmission installed between the sheave and the generator in such a way that the rotation speed of the generator is greater than that of the sheave.

14. The apparatus according to claim 1, which further comprises mechanical energy storage installed between the sheave and the generator and arranged to receive and store mechanical energy from several movements of the sheave and to supply stored mechanical energy to the generator in batches greater than a threshold value.

15. A method for collecting energy in connection with a sheave system in a hoisting apparatus provided with a sheave system, the method comprising:
generating electric energy by the movement of the sheave system with at least one generator comprising a rotor and at least one stator;
wherein the rotor is connected rigidly to a sheave of the sheave system, and said at least one stator is connected rigidly to the sheave system such that when the load of the hoisting apparatus is rising or lowering, said at least one sheave rotates, whereby the rotor rotates simultaneously but the stator does not rotate, whereby electric energy is induced in the stator;
modifying electric energy induced in the stator and storing it in electric energy storage; and
supplying electric energy stored in the electric energy storage to at least one consumption device,
wherein said at least one generator comprises rotor magnets positioned on several concentric rims in such a way that magnets positioned on different rims induce electric energy in the stator at different phases of the rotation movement of the sheave.

16. The apparatus according to claim 1, wherein said at least one generator comprises an axial flux generator where the magnetic flux of the rotor is directed in a direction of the axis of revolution of the sheave system.

* * * * *